United States Patent
Olson

(10) Patent No.: US 6,871,880 B1
(45) Date of Patent: Mar. 29, 2005

(54) IRRIGATION ADAPTOR

(75) Inventor: Donald O. Olson, El Cajon, CA (US)

(73) Assignee: Olson Irrigation Systems, Santee, CA (US)

( * ) Notice: Subject to any disclaimer, the term of this patent is extended or adjusted under 35 U.S.C. 154(b) by 0 days.

(21) Appl. No.: 10/224,722

(22) Filed: Aug. 20, 2002

Related U.S. Application Data

(60) Provisional application No. 60/313,533, filed on Aug. 20, 2001.

(51) Int. Cl.[7] .................................. F16L 41/00
(52) U.S. Cl. ................ 285/192; 285/194; 285/219; 285/245; 285/247; 29/237
(58) Field of Search ................ 285/255, 245, 285/247, 40, 192, 194, 195, 199, 219; 29/237

(56) References Cited

U.S. PATENT DOCUMENTS

| | | | | |
|---|---|---|---|---|
| 1,618,720 A | * | 2/1927 | Moore | 285/192 |
| 2,248,576 A | * | 7/1941 | McConnohie | 285/245 |
| 2,670,529 A | * | 3/1954 | Thomas | 29/614 |
| 2,760,824 A | * | 8/1956 | Leadbetter | 285/192 |
| 3,477,745 A | * | 11/1969 | Williams et al. | 285/40 |
| 3,843,169 A | * | 10/1974 | Wise | 285/247 |
| 4,190,269 A | * | 2/1980 | Purdy | 285/38 |
| 4,637,638 A | * | 1/1987 | Rush et al. | 285/139.1 |
| 4,749,217 A | * | 6/1988 | Causby et al. | 285/245 |
| 6,017,066 A | * | 1/2000 | Giuffre' | 285/247 |
| 6,557,788 B1 | * | 5/2003 | Huang | 285/255 |

OTHER PUBLICATIONS

Nine (9) pictures of a flexible hose adaptor from Agricultural Products, Inc. (API).

Six (6) pages of printouts from the API website that may be relevant to the device of the preceding entry.

* cited by examiner

*Primary Examiner*—David Bochna
(74) *Attorney, Agent, or Firm*—J. Mark Holland & Associates

(57) ABSTRACT

Apparatus and methods include an adaptor to establish a flow path through the side of a first piece of tubing (rather than the end of the tubing) into a second piece of tubing or other device. The adaptor includes a threaded head slightly larger than the hole in the side of the tubing into which it is to be inserted, and gripping portions to assist in forcing the threaded head through the opening. After the head has been inserted, a sealing element is tightened to prevent leakage. To join lay-flat tubing to drip tubing, the other end of the adaptor includes an annular barbed end; a sleeve member around the barbed end; and cooperating structures acting between the barbed end and the sleeve to move those relative to each other. Barb structures on the sleeve member cooperate with the barbed end to sealingly engage the drip-tubing end.

15 Claims, 3 Drawing Sheets

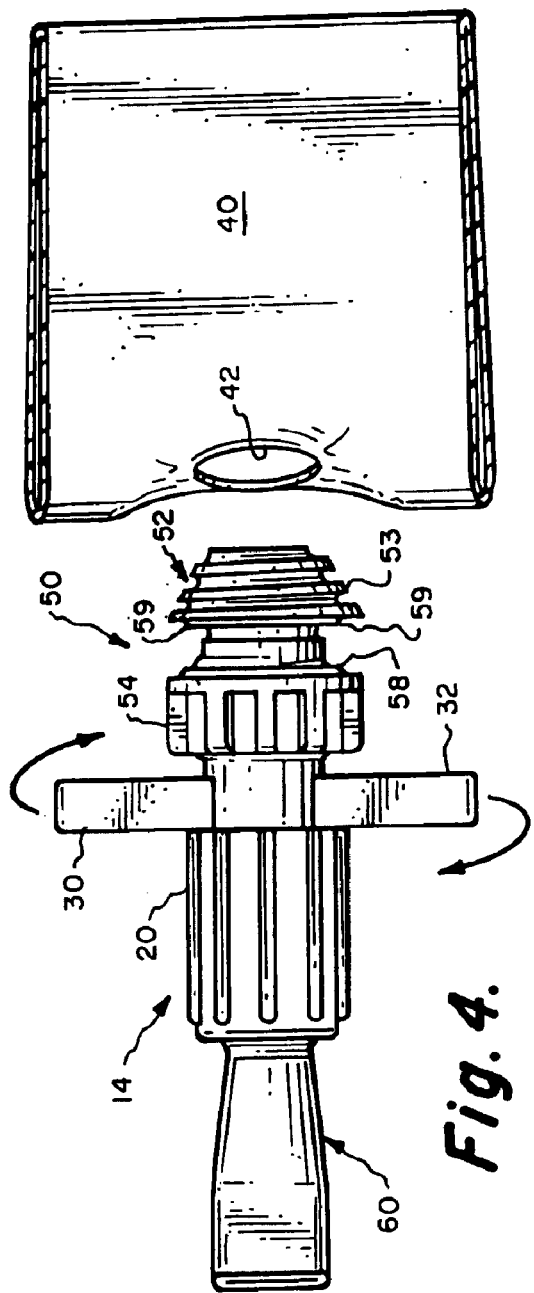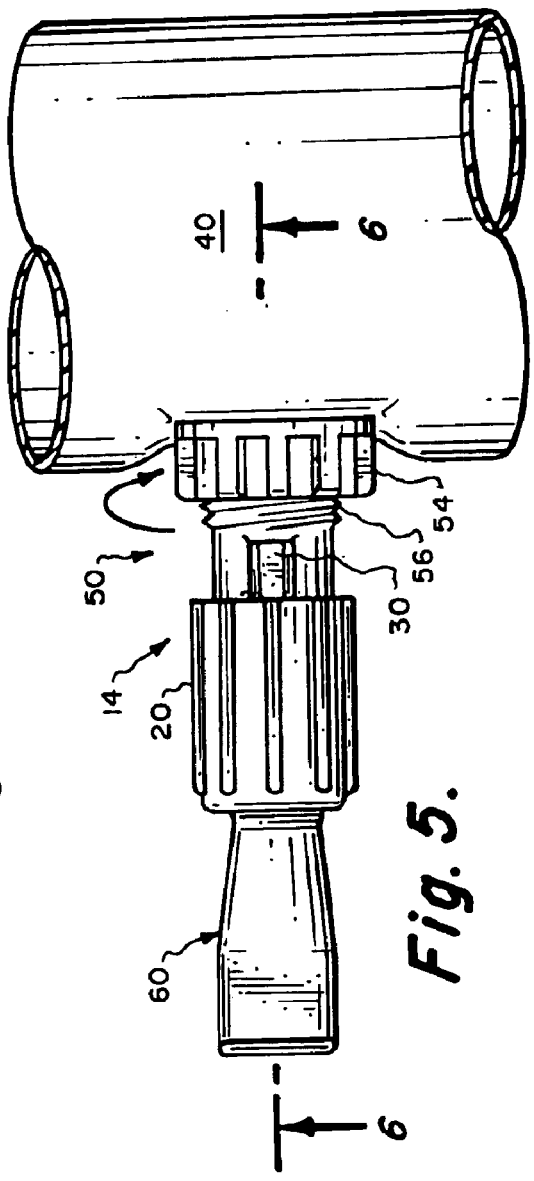

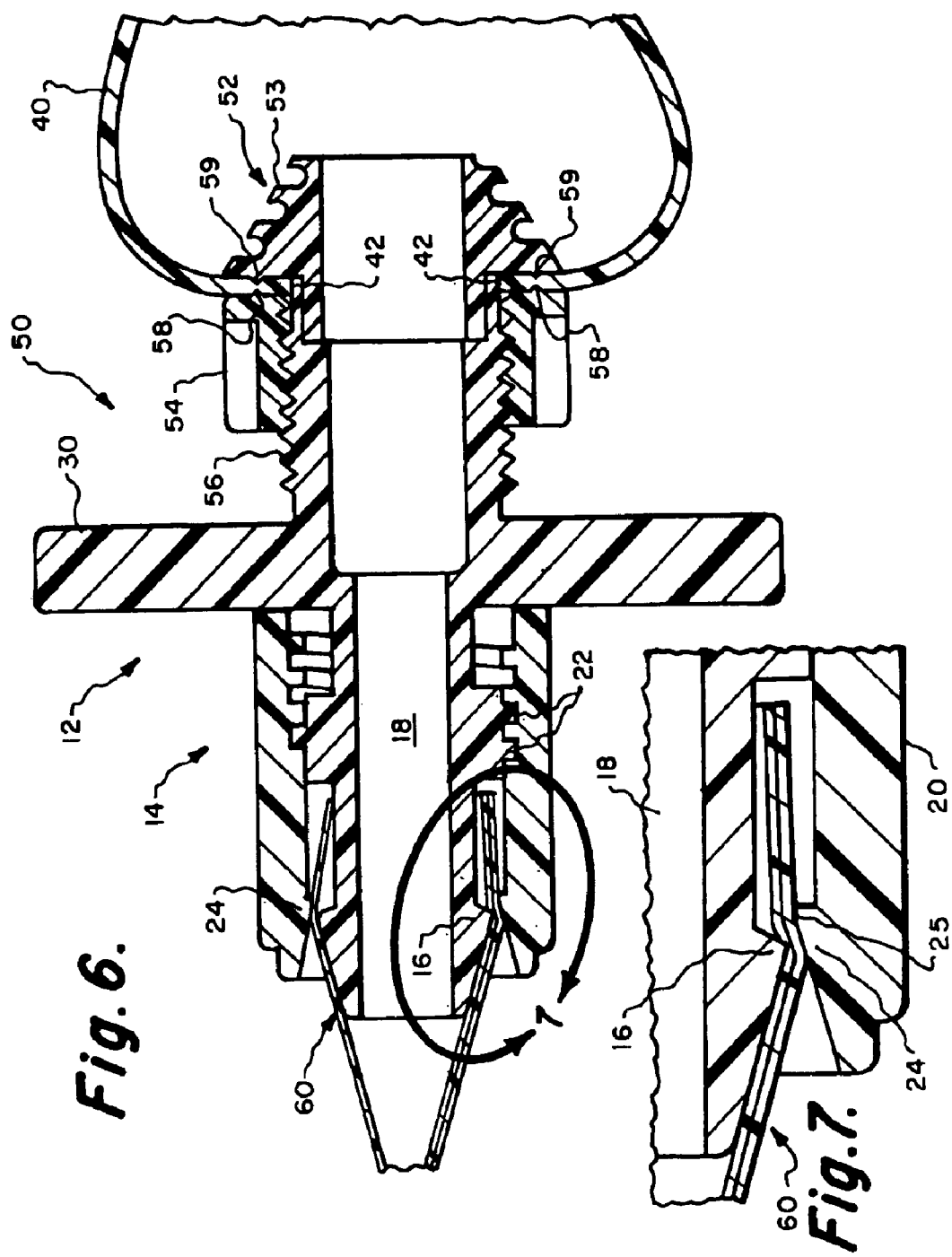

IRRIGATION ADAPTOR

This application is based on provisional application Ser. No. 60/313,533 filed on Aug. 20, 2001.

BACKGROUND OF THE INVENTION

This invention relates generally to methods and apparatus for connecting irrigation tubing or similar devices, and specifically to methods and apparatus to establish a flow path through the side of a first piece of tubing (rather than the end of the tubing) into a second piece of tubing (into its end, side, or otherwise) or other device or structure, and to connect tubing that has a non-uniform sidewall material thickness (such as "drip irrigation" tubing).

Within the irrigation industry, lay-flat tubing is relatively large flexible tubing, capable of transporting a relatively large volume of water or other fluid.

Drip tubing is relatively smaller tubing, which conventionally has a non-uniform wall thickness, in which a thicker portion of the sidewall includes a drip channel formed along the length of the sidewall. Typically, water or other fluid in the main body of the drip tubing "drips" from that main body (and thus irrigates the soil or other material under the drip tubing) by pressing the fluid in the tubing main body (such as via normal pump or water pressure) and thereby forcing the fluid through openings into the drip channel, and thereafter out other openings from that drip channel to the soil or other thing to be irrigated.

Due to the relative flow volumes of lay-flat tubing (relatively high) and drip tubing (relatively smaller) and other factors, attempts have been made to use lay-flat tubing as a "main" line for water supply and to "tap into" that main line with a plurality of drip tubing lines. None of those attempts has been satisfactory. Among other things, prior art efforts result in substantial leakage at the junction between the two types of tubing.

OBJECTS AND ADVANTAGES OF THE INVENTION

It is, therefore, an object of the invention to provide improved apparatus and methods to establish a flow path from a piece of lay-flat tubing into a piece of drip tubing. In addition, and as will be appreciated by persons of ordinary skill in the art, many of the beneficial aspects of the invention are useful solely in connection with lay-flat tubing or drip tubing, rather than specifically in the combination of connecting the two to each other.

The preferred embodiment of the invention is characterized by a piece of lay-flat tubing having a hole through its side; a piece of drip tubing having a sidewall with non-uniform thickness, including a relatively thicker portion formed to include a drip channel; and an adaptor having a flowpath therethrough. The adaptor preferably includes an insertable head at a first end thereof, the head being slightly larger than the hole in the side of the lay-flat tubing, and the adaptor further preferably includes a sealing element that can be tightened to prevent leakage around the head after the head has been inserted into the hole.

For connection to conventional drip tubing, the adaptor can further include an annular barbed end with a fluid path therethrough, and a sleeve member positioned around the barbed end, with cooperating structures acting between the barbed end and the sleeve to move those relative to each other. To provide the desired seal on the non-uniform drip tubing sidewall, the sleeve member preferably includes an internal barb sized and initially positioned to permit insertion of the tubing end past both the barbed end and the internal barb, with the barbed end and the sleeve's internal barb fabricated sufficiently strongly to deform the tubing's non-uniform sidewall to a more uniform thickness upon the relative movement of the sleeve and the barbed end.

Another object of the invention is the provision of an adaptor to establish a flow path through the side of a first piece of tubing, in which the adaptor includes a body having a flowpath therethrough, and an insertable head that is slightly larger than a hole in the side of the tubing into which it is to be inserted. Gripping portions can be provided to assist in forcing the head through the opening, and a sealing element can be tightened to prevent leakage around the head after the head has been inserted. Preferably, the insertable head is threaded to further facilitate insertion through the sidewall hole.

A further object of the invention is the provision of an adaptor for connecting tubing having an non-uniform sidewall, the adaptor being characterized by an annular barbed end with a fluid path therethrough, a sleeve member positioned around the barbed end, and cooperating structures acting between the barbed end and the sleeve to move those relative to each other. The sleeve member is characterized by an internal barb or detent sized and initially positioned to permit insertion of the non-uniform sidewall tubing end past both the barbed end and the internal barb. Preferably, the barbed end and the internal barb are fabricated sufficiently strongly to deform the tubing's non-uniform sidewall to a uniform thickness upon the relative movement of the sleeve and the barbed end. Also preferably, the cooperating structures include interacting threads on the sleeve and the barbed end, and rotation of the threads causes the barbed end and the internal barb to deform the tubing's non-uniform sidewall.

An additional object of the invention is the provision of various methods related to the apparatus described herein.

Other objects and advantages of the invention will be apparent from the following specification and the accompanying drawings, which are for the purpose of illustration only.

BRIEF DESCRIPTION OF THE DRAWINGS

FIG. 4 illustrates insertion of the adaptor into a hole in the side of conventional lay-flat tubing;

FIG. 5 is similar to FIG. 4, but illustrates the adaptor after its insertion into a hole in the side of conventional lay-flat tubing, and further illustrates tightening of the adaptor to the side of that lay-flat tubing;

FIG. 6 is a partial sectional view, taken along line 6—6 of FIG. 5; and

FIG. 7 is a partial sectional view, taken along line 7—7 of FIG. 6.

DESCRIPTION OF PREFERRED EMBODIMENT

Figure 1:
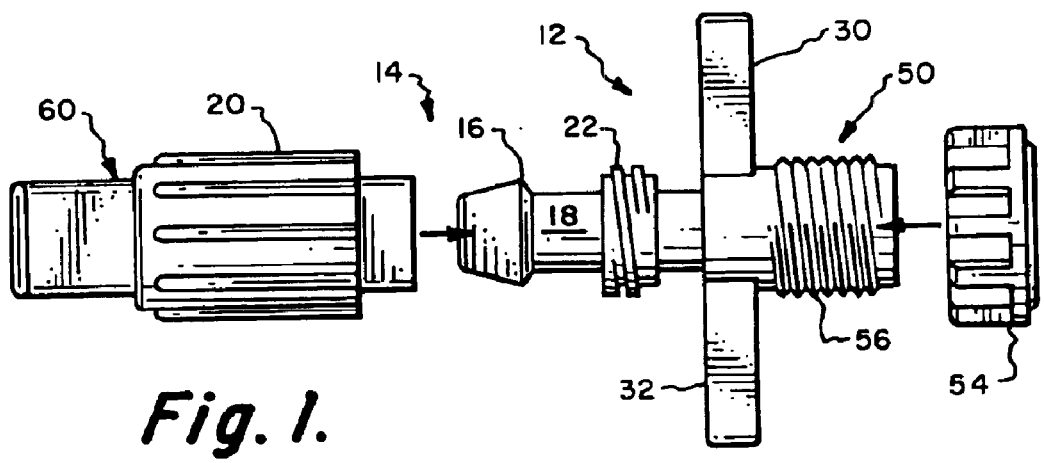
FIG. 1 is an exploded view of a preferred embodiment of the adaptor embodiment of the invention, prior to the attachment of an oversize head.

A preferred embodiment of the invention is illustrated in FIGS. 1-7, and is directed to apparatus and methods to establish flow path from a piece of lay-flat tubing into a piece of drip tubing. Persons of ordinary skill in the art will understand that many of the beneficial aspects of the invention are useful solely in connection with lay-flat tubing or drip tubing, rather than specifically in the combination of connecting the two to each other.

Persons of ordinary skill in the art will understand that the various elements of the invention can be fabricated from any of a wide range of suitable materials and methods of manufacture. Preferably, the tubing elements 40 and 60 are extruded or otherwise fabricated from a tough, pliable, somewhat plastic material, so that it can be readily flexed, opened, and "bitten" as described herein. The other components are preferably injection molded from lightweight, suitably strong plastic or similar material, but again, can be fabricated from a wide variety of suitable materials.

In addition, persons of ordinary skill in the art will understand that the elements can range widely in their dimensions, so long as their relative sizes allow them to interact in the manner described herein.

In general terms, the preferred embodiment of the invention includes an adaptor 12 having a first portion 14 useful for connecting to conventional drip tubing 60. The first portion 14 preferably includes a barbed end 16 on a hollow body 18. Portion 14 preferably includes cooperating structures such as cooperating threads 22 acting between the barbed end 16 and a sleeve 20.

Figure 2:
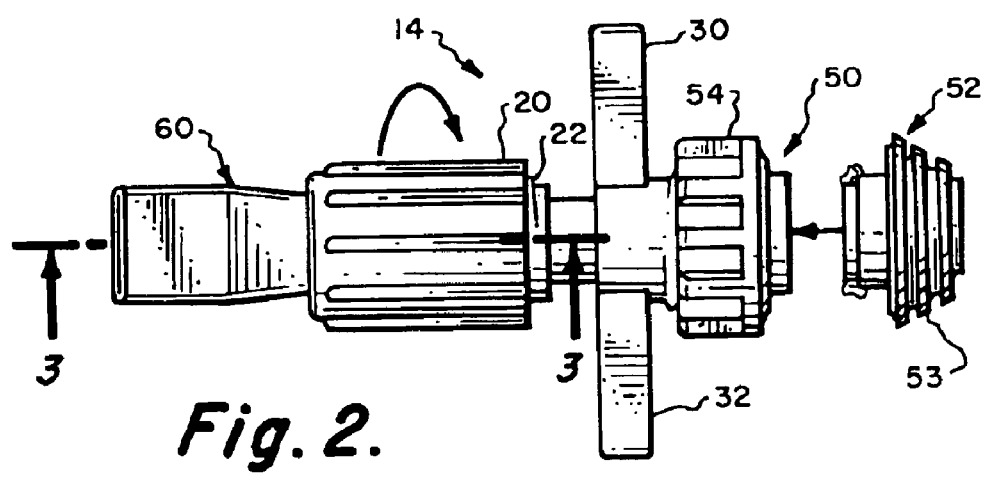
FIG. 2 is similar to FIG. 1, but illustrates the attachment of an oversize head (to the right-hand end) and the assembly of conventional drip tubing to the left-hand end.
Figure 3:
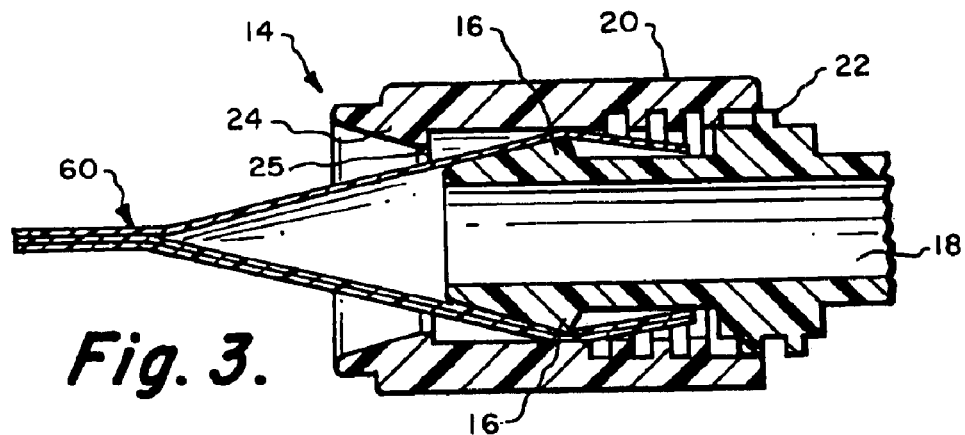
FIG. 3 is a partial sectional view, taken along line 3—3 of FIG. 2.

The sleeve 20 further preferably includes an internal barb or detent 24 (see FIGS. 3 and 6) that is sized and configured to cooperate with barbed end 16 to sealingly grip tubing such as tubing 60. Although the invention is useful for tubing having a sidewall with a uniform thickness, it is especially useful for embodiments in which the tubing has a non-uniform sidewall (such as conventional drip tubing, illustrated in FIGS. 3 and 6). In the preferred embodiment, the cooperating structures such as threads 22 acting between the barbed end 16 and the sleeve 20 to permit a user to move those relative to each other. As shown in FIG. 1, the preferred method of assembly includes pushing the tubing 60 through the sleeve 20 and then over the barbed end 16. As shown in FIGS. 2 and 3, sleeve 20 is preferably rotated so that the threads 22 preferably pull first portion 14 of the assembly into the position shown in FIGS. 4 and 6.

As best illustrated in FIGS. 3, 6, and 7, the internal barb or detent 24 is preferably provided with a relatively flattened portion 25 at its tip, where a sharp edge might otherwise cut severely into the tubing 60. Among other things, that flattened portion 25 preferably is configured and dimensioned have a slightly smaller internal diameter (ID) than the outer diameter (OD) of the barbed end 16. Persons of ordinary skill in the art will understand that, by providing the barbs with that relative dimension, the last part of the rotation of sleeve 20 (FIG. 2) will force that flat surface 25 to ride up "over" the internal barb 16 and "cut" or stretch or otherwise deform the multiple-thickness area of tubing 60 (which multiple-thickness area is shown in FIGS. 3 and 6 as being in the bottom half of those drawings) to provide a tight seal.

In FIG. 7, the invention is illustrated as showing a "cutting" of the internal layer of the multiple layered area of tubing 60. Persons of ordinary skill in the art will understand that the precise deformation of the tubing 60 by use of the invention may vary from that shown in FIG. 7.

Persons of ordinary skill in the art will also understand that, without this interaction, the areas adjacent the multiple-thickness area of the tubing sidewall will tend to gap and leak. In prototypes of the invention, the "cutting" action of this last portion of the sleeve rotation is noticeable to a user rotating sleeve 20, as the rotation requires more force as the teeth 16 and 24 approach each other and then noticeably less force as the flat surface 25 rides over tooth 16. In the preferred embodiment, the rotation of sleeve 20 is stopped by arms or gripping portion 30 and 32 (which are further discussed below). Preferably, that stop occurs at a position that maintains the desired sealing of the tubing 60, rather than permitting the sleeve 20 to rotate "too far" and the teeth or barbs 16 and 24 to move out of sealing engagement with the tubing 60.

Although the invention is illustrated with a flattened portion 25, persons of ordinary skill in the art will understand that other approaches may be used to achieve the desired deformation/sealing of the tubing 60 at the thickened portion, including without limitation providing even more precise dimensional tolerances between the OD of the barbed end 16 and the ID of the internal barb 24.

Persons of ordinary skill in the art will understand that any suitable means can be utilized to provide the desired movement and application of force between sleeve 20 (and its barb 24) and barbed end 16, as described herein. Among other things, the precise location and size of the threads on the first portion 14 can vary widely. Moreover, the desired movement and application of force can be provided by other structures, including by way of examples and not by way of limitation an over-center latch (not shown) acting between the sleeve 20 and barbed end 16 to push them apart from each other, or from one or more adjustable screws mounted on the exterior of the sleeve portions 14 and 16 (with the screw oriented parallel, perpendicularly, or otherwise with respect to the longitudinal axis of the central tubing member 12).

To connect the apparatus to conventional lay-flat tubing 40 (see FIGS. 4-6), the apparatus preferably includes a second portion 50. As illustrated in FIGS. 2, 4, and 6, the second portion preferably includes a head portion 52 that can be inserted into a hole 42 in the lay-flat tubing 40, and can be held in a sealing relationship there by tightening a collar 54 actuated by threads 56 (see FIG. 5 for an illustration of the tightening of collar 54 in that regard). Collar 54 is preferably provided with sealing ridge or barb 58, and the back of head 52 is preferably provided with sealing ridge or barb 59, to bite into and provide an even better seal of the hole 42.

To assist in inserting the head 52 into the hole 42, threads 53 can be provided on the leading face of head 52. Persons of ordinary skill in the art will understand that those threads preferably begin at a size at or smaller than the hole 42, to facilitate their initial engagement of with the hole 42, and they taper to gradually and temporarily stretch the hole 42 as the head 52 passes through it. One or more gripping portions such as arms 30 and 32 can be provided to assist in turning the head 52 during its insertion into the hole 42.

A preferred method of fabricating and assembling second portion 50 of the apparatus is illustrated in FIGS. 1 and 2. The central hollow body portion of the adaptor can be molded separately from the head 52. After the collar 54 is engaged with the threads 56, the head 52 can be attached to the central body by any suitable means, including without limitation by spin welding, gluing, or the like.

Persons of ordinary skill in the art will understand that other methods of manufacture and assembly can be used without departing from the scope of the invention.

Although the preferred embodiment of this second portion 50 is described herein in connection with lay-flat tubing, persons of ordinary skill in the art will understand that it is useful in a broad range of applications other than just lay-flat tubing.

The apparatus and methods of the invention have been described with some particularity, but the specific designs, constructions and steps disclosed are not to be taken as delimiting of the invention. Obvious modifications will make themselves apparent to those of ordinary skill in the art, all of which will not depart from the essence of the invention and all such changes and modifications are intended to be encompassed within the appended claims.

I claim:

1. The combination of a first piece of tubing and an adaptor to establish a flow path through the side of said first piece of tubing, said adaptor including: a body having a flowpath therethrough, an insertable head at a first end of said body, said head being slightly larger than a hole in the side of the tubing into which it is to be inserted, at least one laterally extending gripping arm to assist in forcing said insertable head through the hole, and a sealing element that can be tightened to prevent leakage around said head after said head has been inserted.

2. The combination of claim 1, in which said insertable head is threaded to facilitate insertion through the hole in the side of the first piece of tubing.

3. The adaptor of claim 1 in combination with tubing having material memory, in which said material memory allows said hole to temporarily stretch to permit insertion of said slightly larger head through said hole and to then return to a size smaller than said slightly larger head.

4. The adaptor of claim 1, in which said insertable head at a first end of said body includes a relatively flat, non-curvilinear surface that confronts the interior of the tubing after insertion therein.

5. A method of providing a flow path from the side of tubing, including the steps of:
   providing a hole in the tubing sidewall;
   providing the adaptor of claim 1;
   inserting the head of the adaptor through the hole in the tubing sidewall; and
   tightening said sealing element to prevent leakage around said head.

6. The combination of a first piece of tubing having a non-uniform sidewall and an adaptor for connecting the tubing, including: an annular barbed end with a fluid path therethrough; a sleeve member positioned around said barbed end; cooperating structures acting between said barbed end and said sleeve to move those relative to each other; said sleeve member having an internal barb sized and initially positioned to permit insertion of the tubing end past both said barbed end and said internal barb, said barbed end and said internal barb being shaped and sized and fabricated sufficiently strongly to deform the tubing's non-uniform sidewall to a uniform thickness upon said relative movement of said sleeve and said barbed end; and wherein, after the tubing end has been inserted into said adaptor but before said deforming movement has occurred, said internal barb on said sleeve is positioned relatively further from said tubing end than is said barbed end.

7. The adaptor of claim 6, in which said cooperating structures include interacting threads on said sleeve and said barbed end, and rotation of said threads causes said barbed end and said internal barb to deform the tubing's non-uniform sidewall.

8. The adaptor of claim 6, in which, after the tubing end has been inserted into said adaptor but before said deforming movement has occurred, said internal barb on said sleeve is positioned relatively further from said tubing end than is said barbed end.

9. A first adaptor for connecting tubing having an non-uniform sidewall, including: an annular barbed end with a fluid path therethrough; a sleeve member positioned around said barbed end; cooperating structures acting between said barbed end and said sleeve to move those relative to each other; said sleeve member having an internal barb sized and initially positioned to permit insertion of the tubing end past both said barbed end and said internal barb, said barbed end and said internal barb being shaped and sized and fabricated sufficiently strongly to deform the tubing's non-uniform sidewall to a uniform thickness upon said relative movement of said sleeve and said barbed end; and including a second adaptor having a body having a flowpath therethrough, and insertable head at a first end of said body, said head being slightly larger than a hole in the side of the tubing into which it is to be inserted, gripping portions to assist in forcing said insertable head through the hole, and a sealing element that can be tightened to prevent leakage around said head after said head has been inserted formed at the opposite end from said barbed end, so that a single flowpath is provided through the first adaptor and the second adaptor.

10. A method of connecting tubing that has a non-uniform sidewall, including the steps of:
    providing tubing with a non-uniform sidewall, said tubing having an end;
    providing an adaptor for connecting tubing having an non-uniform sidewall, including: an annular barbed end with a fluid path therethrough; a sleeve member positioned around said barbed end; cooperating structures acting between said barbed end and said sleeve to move those relative to each other; said sleeve member having an internal barb sized and initially positioned to permit insertion of the tubing end past both said barbed end and said internal barb, said barbed end and said internal barb being shaped and sized and fabricated sufficiently strongly to deform the tubing's non-uniform sidewall to a uniform thickness upon said relative movement of said sleeve and said barbed end;
    inserting the end of said tubing into said adaptor; and
    moving said sleeve and said barbed end relatively to each other sufficiently to deform said tubing's non-uniform sidewall to uniform thickness.

11. Apparatus to establish a flow path from a piece of lay-flat tubing into a piece of drip tubing, including:
    a piece of lay-flat tubing having a hole through its side;
    a piece of drip tubing having a sidewall with non-uniform thickness, including a relatively thicker portion formed to include a drip channel;
    an adaptor having a flowpath therethrough, said adaptor including an insertable head at a first end thereof, said head being slightly larger than said hole in the side of the lay-flat tubing, said adaptor further including a sealing element that can be tightened to prevent leakage around said head after said head has been inserted into said hole, said adaptor further including an annular barbed end with a fluid path therethrough, said adaptor further including a sleeve member positioned around said barbed end, said adaptor further including cooperating structures acting between said barbed end and said sleeve to move those relative to each other, said sleeve member having an internal barb sized and initially positioned to permit insertion of the tubing end past both said barbed end and said internal barb, said barbed end and said internal barb fabricated sufficiently strongly to deform the tubing's non-uniform sidewall to a uniform thickness upon said relative movement of said sleeve and said barbed end.

12. The apparatus of claim 11, said adaptor further including gripping portions to assist in forcing said threaded head through the hole.

13. The combination of a first piece of tubing having a non-uniform sidewall and an adaptor for connecting the tubing, including: an annular barbed end with a fluid path therethrough; a sleeve member positioned around said barbed end; cooperating structures acting between said barbed end and said sleeve to move said sleeve toward the tubing end; said sleeve member having an internal barb sized and initially positioned to permit insertion of the tubing end past both said barbed end and said internal barb, said barbed end and said internal barb being shaped and sized and fabricated sufficiently strongly to deform the tubing's non-uniform sidewall to a uniform thickness upon said relative movement of said sleeve and said barbed end; and wherein, after the tubing end has been inserted into said adaptor but before said deforming movement has occurred, said internal barb on said sleeve is positioned relatively further from said tubing end than is said barbed end.

14. The adaptor of claim 13, in which said cooperating structures include interacting threads on said sleeve and said barbed end, and rotation of said threads causes said barbed end and said internal barb to deform the tubing's non-uniform sidewall.

15. The combination of tubing having a sidewall thicker on at least one portion of its circumference than at other portions of its circumference and an adaptor for connecting said tubing having a sidewall thicker on at least one portion of its circumference than at other portions of its circumference, said adaptor within said combination comprising:

an annular barbed end with a fluid path therethrough;

a second portion of said adaptor remote from said annular barbed end, said fluid path extending from said annular barbed end to said second portion;

a sleeve member positioned around said barbed end, said sleeve member including an internal barb having a flattened portion;

cooperating structures acting between said barbed end and said sleeve to facilitate movement of said barbed end and said sleeve relative to each other, from a first position in which said sleeve's internal barb is further from said second portion than is said barbed end to a second position in which said sleeve's internal barb is closer to said second portion than said sleeve's internal barb was in said first position;

said barbed end and said flattened portion being adapted to deform the tubing's thicker circumferential portion to a substantially uniform thickness upon said relative movement of said sleeve and said barbed end.

\* \* \* \* \*